(12) United States Patent
Nakajima et al.

(10) Patent No.: US 9,250,585 B2
(45) Date of Patent: Feb. 2, 2016

(54) POLYIMIDE TUBE, PROCESS FOR PRODUCING THE SAME AND FIXING BELT

(75) Inventors: Shingo Nakajima, Osaka (JP); Jun Sugawara, Osaka (JP); Akira Mizoguchi, Osaka (JP); Yoshimasa Suzuki, Sennan-gun (JP); Yusuke Uchiba, Sennan-gun (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 812 days.

(21) Appl. No.: 12/809,772

(22) PCT Filed: Sep. 10, 2008

(86) PCT No.: PCT/JP2008/066353
§ 371 (c)(1),
(2), (4) Date: Jun. 21, 2010

(87) PCT Pub. No.: WO2009/081630
PCT Pub. Date: Jul. 2, 2009

(65) Prior Publication Data
US 2010/0279045 A1    Nov. 4, 2010

(30) Foreign Application Priority Data

Dec. 25, 2007   (JP) ................................ 2007-332775

(51) Int. Cl.
| | |
|---|---|
| B32B 1/08 | (2006.01) |
| B29C 41/04 | (2006.01) |
| G03G 15/20 | (2006.01) |
| B32B 7/12 | (2006.01) |
| B32B 27/08 | (2006.01) |
| B32B 27/28 | (2006.01) |
| B32B 27/30 | (2006.01) |

(52) U.S. Cl.
CPC .............. *G03G 15/2057* (2013.01); *B32B 1/08* (2013.01); *B32B 7/12* (2013.01); *B32B 27/08* (2013.01); *B32B 27/281* (2013.01); *B32B 27/304* (2013.01); *G03G 2215/2016* (2013.01); *Y10T 428/139* (2015.01)

(58) Field of Classification Search
USPC ................. 428/36.9, 36.91, 36.92, 332, 338; 264/310; 427/231
See application file for complete search history.

(56) References Cited

U.S. PATENT DOCUMENTS

| | | | |
|---|---|---|---|
| 6,090,326 A * | 7/2000 | Hirohata et al. .............. 264/310 |
| 6,699,548 B2 * | 3/2004 | van Weperen et al. ........ 428/36.3 |

(Continued)

FOREIGN PATENT DOCUMENTS

| | | |
|---|---|---|
| JP | 3-25478 | 2/1991 |
| JP | 5-40425 | 2/1993 |

(Continued)

OTHER PUBLICATIONS

English machine translation of JP 2007-109640.*

*Primary Examiner* — Yan Lan
(74) *Attorney, Agent, or Firm* — Drinker Biddle & Reath LLP

(57) ABSTRACT

Provided are a polyimide tube including a polyimide resin composition, wherein the polyimide resin composition contains a polyimide resin in which an acicular highly thermally conductive filler such as carbon nanotubes is dispersed in 15 volume percent or more relative to the total volume of the composition; the acicular highly thermally conductive filler has an orientation of 1.3 or more, the orientation being represented by the modulus of elasticity of the polyimide resin composition in the circumferential direction/the modulus of elasticity of the polyimide resin composition in the axial direction; and the polyimide tube has high thermal conductivity, is excellent in terms of mechanical strength and indentation strength, and provides a high fixing property and an excellent offsetting property; a process for producing such a tube; and a fixing belt including such a tube serving as a base member.

5 Claims, 2 Drawing Sheets

(56) References Cited

U.S. PATENT DOCUMENTS

| | | | |
|---|---|---|---|
| 2006/0127686 A1* | 6/2006 | Meloni | 428/473.5 |
| 2006/0292360 A1* | 12/2006 | Hays et al. | 428/323 |
| 2010/0055365 A1* | 3/2010 | Nakajima et al. | 428/36.9 |

FOREIGN PATENT DOCUMENTS

| | | | |
|---|---|---|---|
| JP | 8-80580 | | 3/1996 |
| JP | H09-328610 A | | 12/1997 |
| JP | 2003-255640 | | 9/2003 |
| JP | 2004-123867 | | 4/2004 |
| JP | 2005-215028 | | 8/2005 |
| JP | 2006-330405 | | 12/2006 |
| JP | 2007-23149 | | 2/2007 |
| JP | 2007-25475 | | 2/2007 |
| JP | 2007-109640 | | 4/2007 |
| JP | 2007-152205 | | 6/2007 |
| JP | 2007-272223 | | 10/2007 |
| WO | WO2007/078141 | * | 7/2007 |
| WO | WO2008/044643 | * | 4/2008 |

* cited by examiner

POLYIMIDE TUBE, PROCESS FOR PRODUCING THE SAME AND FIXING BELT

TECHNICAL FIELD

The present invention relates to a polyimide tube used for, for example, a fixing belt of an image-forming apparatus. Specifically, the present invention relates to a polyimide tube that is excellent in terms of thermal conductivity, mechanical strength, and, in particular, compressive strength (indentation load) and can provide an excellent fixing property when being used for a fixing belt. The present invention also relates to a process for producing such a polyimide tube and a fixing belt including such a polyimide tube serving as a belt base member.

BACKGROUND ART

In general, in an image-forming process with an image-forming apparatus employing an electrophotographic technique such as a copier or a laser-beam printer, after a toner image is formed on a transfer-receiving material such as a recording paper sheet through an exposing step, a developing step, and a transferring step, a fixing step of fixing the unfixed toner image to the transfer-receiving material is performed. The fixing process is generally performed by heating and pressing an unfixed toner image to fuse the unfixed toner image with a transfer-receiving material. As for a measure for the heating and pressing, a process is commonly employed in which a fixing roller and a pressing roller are disposed so as to face each other, and a transfer-receiving material on which an unfixed toner image is disposed is passed between the rollers to press the unfixed toner image between the rollers and to heat the unfixed toner image by using a heating source installed in the fixing roller.

Japanese Unexamined Patent Application Publication No. 5-40425 discloses a process in which a steel use stainless (SUS) tube is used as the fixing roller. However, SUS tubes are expensive in terms of material cost and processing cost and hence have a problem of the costs. SUS tubes also have a problem in that SUS tubes have poor flexibility and hence end portions and the like of the SUS tubes tend to suffer from cracking, for example, when paper sheets are caught in the SUS tubes.

In recent years, as illustrated in FIG. 1, a process in which an unfixed toner image 5 on a transfer-receiving material 4 is heated with heating means (heater) 2 through a thin endless belt 1 (fixing belt) and pressed with a pressing roller 3 to fix the unfixed toner image 5 to form a fixed toner image 6 has been developed. Such a fixing belt is commonly an endless belt in which a polyimide tube, which is excellent in terms of heat resistance, mechanical strength, tear strength, flexibility, a mold release property, and the like, is used as a base member and a fluorocarbon resin layer is disposed on the outer surface of the base member.

To improve the thermal conductivity of a fixing belt in which a polyimide tube is used as a base member and to achieve, for example, a decrease in waiting time after the turning-on of power, a decrease in power consumption, an increase in fixing speed, and a decrease in fixing temperature, a process in which the polyimide tube is made to contain an inorganic filler that is excellent in terms of thermal conductivity has been disclosed. Such inorganic fillers proposed are carbon black, silicon carbide, silica, and the like (Japanese Unexamined Patent Application Publication No. 3-25478); boron nitride (Japanese Unexamined Patent Application Publication No. 8-80580); carbon nanotubes (Japanese Unexamined Patent Application Publication No. 2004-123867); and the like.

[Patent Document 1] Japanese Unexamined Patent Application Publication No. 5-40425
[Patent Document 2] Japanese Unexamined Patent Application Publication No. 3-25478
[Patent Document 3] Japanese Unexamined Patent Application Publication No. 8-80580
[Patent Document 4] Japanese Unexamined Patent Application Publication No. 2004-123867

DISCLOSURE OF INVENTION

Problems to be Solved by the Invention

However, addition of an inorganic filler in a large amount causes a problem of a decrease in the mechanical strength of a polyimide tube. For example, as specifically demonstrated in examples of Patent Document 4, high mixing proportions of carbon nanotubes cause a considerable decrease in the mechanical strength such as the tear strength of a polyimide tube.

It has also been found that use of an inorganic filler such as boron nitride causes a problem in that a tube having an insufficient compressive strength is provided, the tube deforms under pressure, and hence the offsetting property is degraded. Here, the offsetting property is a property of suppressing an offsetting phenomenon caused when a toner image is fixed with heat. The offsetting phenomenon is one in which a portion of toner is transferred to a fixing belt and moved again to a transfer paper sheet after one turn of the fixing belt, resulting in the formation of a ghost image.

An object of the present invention is to provide a polyimide tube having high thermal conductivity, being excellent in terms of mechanical strength and compressive strength, and providing a high fixing property and an excellent offsetting property. Another object of the present invention is to provide a process for producing a polyimide tube that is excellent in terms of the above-described characteristics. Still another object of the present invention is to provide a fixing belt including a polyimide tube that is excellent in terms of the above-described characteristics serving as a base member; allows a decrease in waiting time after the turning-on of power, a decrease in power consumption, an increase in fixing speed, and a decrease in fixing temperature; has excellent mechanical strength; and is excellent in terms of fixing property and offsetting property.

Means for Solving the Problems

The inventors of the present invention have thoroughly studied how to overcome the above-described problems. As a result, they have found that the objects are achieved with a polyimide resin composition containing a polyimide resin in which an acicular highly thermally conductive filler such as carbon nanotubes is dispersed where the mixing amount of the acicular highly thermally conductive filler is made to be 15 volume percent or more relative to the total volume of the composition and the acicular highly thermally conductive filler is made to be highly oriented in the circumferential direction of the tube. Thus, the present invention has been accomplished.

Specifically, the present invention provides, as Claim 1, a polyimide tube including a polyimide resin composition, wherein the polyimide resin composition contains a polyimide resin in which an acicular highly thermally conductive filler is dispersed in 15 volume percent or more relative to a total volume of the composition; and the acicular highly thermally conductive filler has an orientation of 1.3 or more, the orientation being represented by (a modulus of elasticity in a circumferential direction/a modulus of elasticity in an axial direction) of the polyimide resin composition.

This polyimide tube includes a polyimide resin composition that contains a polyimide resin in which an acicular highly thermally conductive filler is dispersed.

The polyimide tube has the following features: the mixing amount of the acicular highly thermally conductive filler is 15 volume percent or more relative to the total volume of the composition; and the orientation of the acicular highly thermally conductive filler is 1.3 or more. Here, the orientation of the acicular highly thermally conductive filler is represented by the modulus of elasticity of the polyimide resin composition in the circumferential direction/the modulus of elasticity of the polyimide resin composition in the axial direction and is a value indicating the degree of orientation of the acicular highly thermally conductive filler in the circumferential direction. The orientation is preferably 1.4 or more.

Here, the acicular highly thermally conductive filler in 15 volume percent or more relative to the total volume of the composition means that the volume of the acicular highly thermally conductive filler is 15% or more relative to the total volume of the polyimide resin composition containing the polyimide resin and the acicular highly thermally conductive filler. This volume percent value is determined on the basis of the absolute specific gravity measured by, for example, an immersion method defined in JIS K7112A method.

Because of the above-described features of the present invention, a polyimide tube having high thermal conductivity and being excellent in terms of mechanical strength and compressive strength can be provided. Here, the compressive strength is a value determined by measuring load (indentation load) when the lower portion of the tube is fixed and the tube is subjected to predetermined compression with an indentation jig. A fixing belt including a polyimide tube being excellent in terms of compressive strength (indentation load) is excellent in terms of offsetting property. Use of such a fixing belt can provide clear images. In addition, because of the high thermal conductivity, an excellent fixing property can be provided.

The invention according to Claim 2 is the polyimide tube according to Claim 1, wherein the acicular highly thermally conductive filler includes carbon nanotubes or acicular titanium oxide.

As for the acicular highly thermally conductive filler, carbon nanotubes or acicular titanium oxide is preferably used. Carbon nanotubes (hereafter, sometimes abbreviated as "CNTs") are carbon tubes having a size of nanometer order. Typical carbon nanotubes have an absolute specific gravity of 2.0 g/cm$^3$, generally have an aspect ratio of 50 to 1000, and are single wall carbon nanotubes and multi-wall carbon nanotubes. Graphite-structure CNTs having such a high aspect ratio are preferred. Multi-wall CNTs have a concentric internal structure. Carbon nanotubes also include, for example, carbon nanofibers having a fiber diameter of 1 μm or less and carbon nanotubes in which carbon members having the shape of a glass without a bottom are stacked on top of one another. The method for producing carbon nanotubes is not particularly restricted. However, carbon nanotubes produced by vapor deposition in which the diameter of carbon nanotubes is readily controlled and carbon nanotubes are readily produced in quantity are preferred.

Carbon nanotubes generally have a short-axis diameter (diameter) of 300 nm or less, preferably 200 nm or less. Carbon nanotubes generally have a length of 50 μm or less, preferably 30 μm or less, and still more preferably 20 μm or less. The short-axis diameter and the long-axis diameter can be determined by, for example, laser scattering or with a scanning electron microscope. When carbon nanotubes have too large a short-axis diameter and a long-axis diameter, the dispersibility of the carbon nanotubes in polyimide varnish tends to be degraded. Thus, there is a possibility of the mechanical strength and the thermal conductivity being degraded or the flatness of the surface being degraded.

When acicular titanium oxide is used, the acicular titanium oxide preferably has a diameter of 5 μm or less, more preferably 3 μm or less; and preferably has a length of 200 μm or less, more preferably 100 μm or less, and still more preferably 50 μm or less. The acicular titanium oxide generally has a length/diameter of about 10 to 100.

The invention according to Claim 3 is the polyimide tube according to Claim 1 or 2, wherein the acicular highly thermally conductive filler is dispersed in the polyimide resin in 15 volume percent or more and 60 volume percent or less relative to the total volume of the composition.

The content of the acicular highly thermally conductive filler in the polyimide resin composition is, as described above, 15 volume percent or more relative to the total volume of the composition and preferably 60 volume percent or less; more preferably 25 volume percent or more and 50 volume percent or less. When the content of the acicular highly thermally conductive filler such as carbon nanotubes is too low, the thermal conductivity of the resultant polyimide tube and a fixing belt including such a polyimide tube serving as a base member is degraded. When the content of the acicular highly thermally conductive filler is too high, the thermal conductivity tends to be degraded. When desired, the acicular highly thermally conductive filler such as carbon nanotubes may be treated with a coupling agent.

The invention according to Claim 4 is the polyimide tube according to any one of Claims 1 to 3, wherein the polyimide tube has a thickness of 10 to 150 μm.

The thickness, outer diameter, length, and the like of the polyimide tube may be appropriately selected in accordance with desired mechanical strength, application, or the like. When a polyimide tube according to the present invention is used as the base member of a fixing belt in an image-forming apparatus employing an electrophotographic technique, the polyimide tube is made to have a thickness of generally 10 to 150 μm, preferably 20 to 120 μm, still more preferably 30 to 100 μm; and an outer diameter of generally 5 to 100 mm, preferably 10 to 50 mm. The length of the polyimide tube can be appropriately determined in accordance with, for example, the size of a transfer-receiving material such as a copying paper sheet.

The polyimide resin may be a thermosetting polyimide resin (also referred to as "condensation polyimide resin") or a thermoplastic polyimide resin. However, a member formed from a thermosetting polyimide resin is preferred in view of heat resistance, tensile strength, the modulus of elasticity in tension, and the like. A polyimide tube formed from a thermosetting polyimide resin can be obtained by the following process: the outer surface of a cylindrical core member or the outer surface or the inner surface of a cylindrical tubular core member is coated with a solution (hereafter, referred to as "polyimide varnish") in which an acicular highly thermally conductive filler such as CNTs is added to and dispersed in an organic solvent solution (hereafter, referred to as "polyimide precursor varnish") containing a polyimide precursor (also referred to as "polyamide acid" or "polyamic acid"); and the coated varnish is dried and subsequently cured by heating.

When the coating layer of the polyimide varnish is dried and the coating layer adhering to the surface of the core member is subsequently cured (imidized) by heating; or solidified so as to have sufficient strength to maintain its tubular structure, the coating layer is released from the surface of the core member, and in the subsequent step, the coating layer is cured by heating. When the polyimide precursor is heated to a maximum temperature of 350° C. to 450° C., polyamide acid is dehydrated and cyclized into polyimide.

As for the thermosetting polyimide resin, condensation wholly aromatic polyimide resins are preferred in view of heat resistance, mechanical strength, and the like. Such a thermosetting polyimide resin is used in, for example, the following manner. A polymerization reaction is caused in an organic solvent between an acid dianhydride such as pyromellitic dianhydride, 3,3',4,4'-diphenyltetracarboxylic dianhydride, or oxydiphthalic dianhydride and diamine such as 4,4'-diaminodiphenyl ether, p-phenylenediamine, 4,4'-diaminobenzanilide, or resorcin oxydianiline to synthesize a polyimide precursor. The resultant organic solvent solution (polyimide varnish) of the polyimide precursor is used to form the shape of a tube. This tube is then heated to cause dehydration and cyclization. Such a polyimide varnish may be an originally synthesized varnish or a commercially available product.

A polyimide resin (imidized resin) used in the present invention may be a homopolymer or a copolymer. When the polyimide resin is a homopolymer, as to the chemical structure thereof, the polyimide resin is preferably at least one polyimide resin selected from the group consisting of a polyimide resin A including a repeating unit represented by Formula (A) below;

[Formula 1]

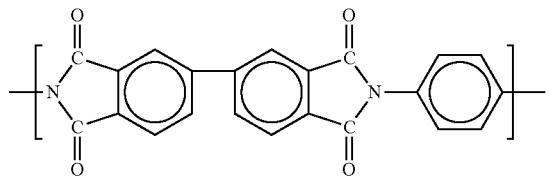

(A)

a polyimide resin B including a repeating unit represented by Formula (B) below; and

[Formula 2]

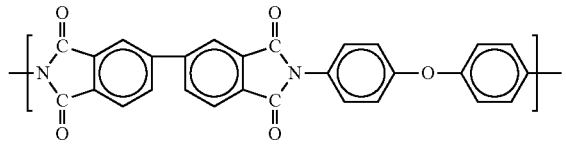

(B)

a polyimide resin C including a repeating unit represented by Formula (C) below,

[Formula 3]

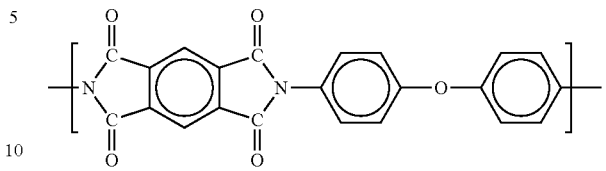

(C)

in view of providing a polyimide tube highly balanced in terms of thermal conductivity, tensile strength, and tensile modulus of elasticity (Claim 5).

These polyimide resins A to C can be used alone or as a mixture of two or more thereof. These polyimide resins including the repeating units A to C can be obtained by a process in which polyimide precursors corresponding to the polyimide resins are formed into tubes and subsequently imidized.

Specifically, to provide a polyimide resin including the repeating unit A, a polyimide precursor is synthesized with 3,3',4,4'-diphenyltetracarboxylic dianhydride and p-phenylenediamine serving as monomers; polyimide varnish containing the polyimide precursor is formed into a tube; and the polyimide precursor is subsequently imidized. The dianhydride component and the diamine component are used in substantially equivalent moles (This is the same as in the following cases).

To provide a polyimide resin including the repeating unit B, a polyimide precursor is synthesized with 3,3',4,4'-diphenyltetracarboxylic dianhydride and 4,4'-diaminodiphenyl ether serving as monomers; polyimide varnish containing the polyimide precursor is formed into a tube; and the polyimide precursor is subsequently imidized.

To provide a polyimide resin including the repeating unit C, a polyimide precursor is synthesized with pyromellitic dianhydride and 4,4'-diaminodiphenyl ether serving as monomers; polyimide varnish containing the polyimide precursor is formed into a tube; and the polyimide precursor is subsequently imidized.

The polyimide resins A to C may be used by blending two or more thereof. In this case, blending a polyimide resin having excellent rigidity and a polyimide resin having excellent flexibility is preferred. From this viewpoint, preferred blends are, for example, a blend of the polyimide resins A and B and a blend of the polyimide resins A and C.

When a polyimide resin used in the present invention is a copolymer, the polyimide resin is preferably at least one polyimide copolymer selected from the group consisting of (1) a polyimide copolymer 1 including a repeating unit represented by Formula (A) below and

[Formula 4]

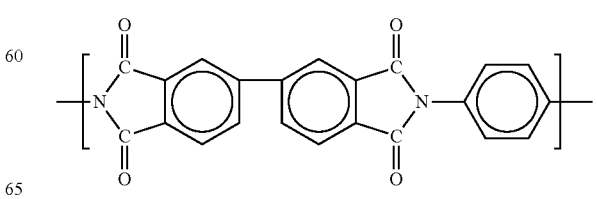

(A)

a repeating unit represented by Formula (B) below;

[Formula 5]

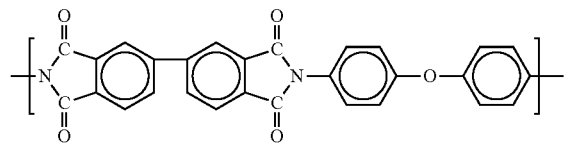

(2) a polyimide copolymer 2 including a repeating unit represented by Formula (D) below and

[Formula 6]

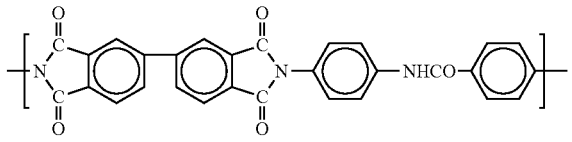

a repeating unit represented by Formula (B) below;

[Formula 7]

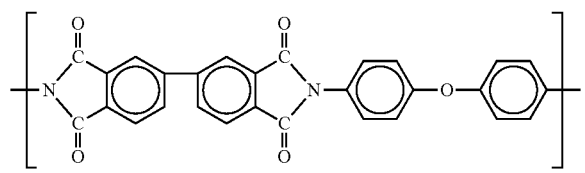

(3) a polyimide copolymer 3 including a repeating unit represented by Formula (E) below and

[Formula 8]

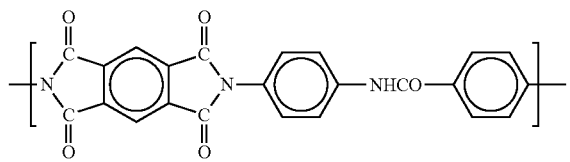

a repeating unit represented by Formula (C) below;

[Formula 9]

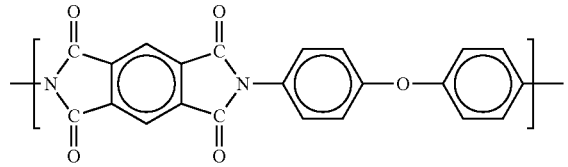

(4) a polyimide copolymer 4 including a repeating unit represented by Formula (A) below and

[Formula 10]

a repeating unit represented by Formula (F) below; and

[Formula 11]

(5) a polyimide copolymer 5 including a repeating unit represented by Formula (A) below and

[Formula 12]

a repeating unit represented by Formula (G) below

[Formula 13]

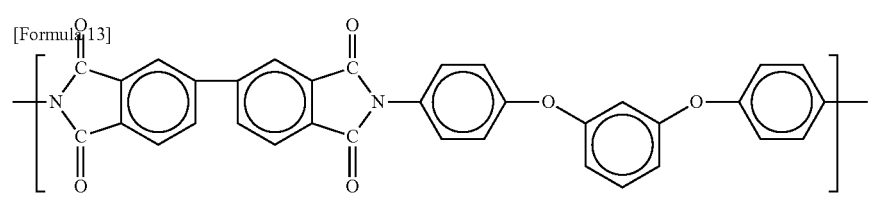

These polyimide copolymers 1 to 5 can be used alone or in combination of two or more thereof. These polyimide copolymers can be obtained by a process in which polyimide precursors corresponding to the polyimide copolymers are formed into tubes and subsequently imidized.

To provide the polyimide copolymer 1 including the repeating unit represented by Formula (A) and the repeating unit represented by Formula (B), a polyimide precursor is synthesized with 3,3',4,4'-diphenyltetracarboxylic dianhydride, p-phenylenediamine, and 4,4'-diaminodiphenyl ether serving as monomers; polyimide varnish containing the polyimide precursor is formed into a tube; and the polyimide precursor is subsequently imidized. The acid dianhydride component and the diamine component are used in substantially equivalent moles (This is the same as in the following cases). To achieve a high balance between rigidity and flexibility, the proportion of the repeating unit (A) is preferably 25 to 95 mol % and the proportion of the repeating unit (B) is preferably 5 to 75 mol %.

To provide the polyimide copolymer 2 including the repeating unit represented by Formula (D) and the repeating unit represented by Formula (B), a polyimide precursor is synthesized with 3,3',4,4'-diphenyltetracarboxylic dianhydride, 4,4'-diaminobenzanilide, and p-phenylenediamine serving as monomers; polyimide varnish containing the polyimide precursor is formed into a tube; and the polyimide precursor is subsequently imidized. To achieve a high balance between rigidity and flexibility, the proportion of the repeating unit (D) is preferably 25 to 95 mol % and the proportion of the repeating unit (B) is preferably 5 to 75 mol %.

To provide the polyimide copolymer 3 including the repeating unit represented by Formula (E) and the repeating unit represented by Formula (C), a polyimide precursor is synthesized with 3,3',4,4'-diphenyltetracarboxylic dianhydride, 4,4'-diaminobenzanilide, and 4,4'-diaminodiphenyl ether serving as monomers; polyimide varnish containing the polyimide precursor is formed into a tube; and the polyimide precursor is subsequently imidized. To achieve a high balance between rigidity and flexibility, the proportion of the repeating unit (E) is preferably 25 to 95 mol % and the proportion of the repeating unit (C) is preferably 5 to 75 mol %.

To provide the polyimide copolymer 4 including the repeating unit represented by Formula (A) and the repeating unit represented by Formula (F), a polyimide precursor is synthesized with 3,3',4,4'-diphenyltetracarboxylic dianhydride, oxydiphthalic dianhydride, and p-phenylenediamine serving as monomers; polyimide varnish containing the polyimide precursor is formed into a tube; and the polyimide precursor is subsequently imidized. To achieve a high balance between rigidity and flexibility, the proportion of the repeating unit (A) is preferably 25 to 95 mol % and the proportion of the repeating unit (F) is preferably 5 to 75 mol %.

To provide the polyimide copolymer 5 including the repeating unit represented by Formula (A) and the repeating unit represented by Formula (G), a polyimide precursor is synthesized with 3,3',4,4'-diphenyltetracarboxylic dianhydride, p-phenylenediamine, and resorcin oxydianiline serving as monomers; polyimide varnish containing the polyimide precursor is formed into a tube; and the polyimide precursor is subsequently imidized. To achieve a high balance between rigidity and flexibility, the proportion of the repeating unit (A) is preferably 25 to 95 mol % and the proportion of the repeating unit (G) is preferably 5 to 75 mol %.

In the present invention, a polyimide resin composition is a resin composition containing an imidized polyimide resin in which an acicular highly thermally conductive filler is dispersed. To provide a polyimide tube including such a polyimide resin composition, polyimide varnish in which an acicular highly thermally conductive filler is added in a predetermined mixing proportion to an organic solvent solution containing a polyimide precursor corresponding to the polyimide resin is used to form a tube by a dispenser method or the like described below and the polyimide precursor is imidized.

In the present invention, in addition to the acicular highly thermally conductive filler, an inorganic filler may be added to the polyimide resin composition as long as the achievement of the objects of the present invention is not hampered. For example, to achieve higher thermal conductivity, a highly thermally conductive filler such as boron nitride may be added.

A polyimide tube according to the present invention can be produced by, for example, a process (dispenser method) in which the outer surface (external surface) or the inner surface (internal surface) of a cylindrical or cylindrical tubular core member is wound in a spiral fashion using a dispenser with an organic solvent solution (polyimide varnish) containing a polyimide precursor and an acicular highly thermally conductive filler such as carbon nanotubes to form a coating layer.

Specifically, in the dispenser method, performed are a step of bringing a discharge opening of a supply part of a dispenser close to or in contact with an outer surface of a cylindrical core member or an outer surface or an inner surface of a cylindrical tubular core member, and forming a coating layer by continuously supplying polyimide varnish from the discharge opening to the outer surface of the cylindrical core member or the outer surface or the inner surface of the cylindrical tubular core member while the core member is rotated and the discharge opening is relatively moved with respect to the core member in a direction of a rotational axis of the core member;

a step of, after the forming of the coating layer, solidifying or curing the coating layer; and a step of, after the solidifying or curing, releasing the coating layer from the core member.

Here, relatively moving the discharge opening with respect to the core member in the direction of the rotational axis of the core member means gradually moving the discharge opening from one end portion to the other end portion of the core member while the core member is being rotated. Accordingly, the polyimide varnish is coated over the core member in a spiral fashion. Here, the polyimide varnish used is prepared by dispersing an acicular highly thermally conductive Filler in a solution in which a polyimide precursor is dissolved in a solvent such as N-methylpyrrolidone. The content of the acicular highly thermally conductive filler is 15 volume percent or more relative to the total solid content of the polyimide varnish. The present invention provides, for example, a process for producing a polyimide tube by the above-described dispenser method.

According to this process for producing a polyimide tube by the dispenser method, the acicular highly thermally conductive filler can be oriented in the circumferential direction and a polyimide tube in which the acicular highly thermally conductive filler has an orientation of 1.3 or more can be obtained. By increasing the orientation in the circumferential direction, excellent compressive strength is achieved and the offsetting property is enhanced. In addition, the effect of enhancing the tensile strength is also provided. When a polyimide tube having a particularly high tensile strength in the circumferential direction is used as the base member of a fixing belt, deformation caused by torsion during operation, collapse caused by buckling, and the like can be suppressed.

A polyimide tube according to the present invention can be used as the base member of a fixing belt. The present invention provides, for example, a fixing belt including the above-described polyimide tube according to the present invention serving as a belt base member and a fluorocarbon resin layer disposed on an outer circumferential surface of the belt base member directly or with an adhesive layer therebetween. This fixing belt is suitably used for, for example, a fixing unit in an image-forming apparatus employing an electrophotographic technique.

When a polyimide tube according to the present invention is used as the base member of a fixing belt, a process of coating the outer circumferential surface of the base member with fluorocarbon resin varnish and the coated varnish is sintered at high temperature may be employed. The above-described polyimide resins, polyimide copolymers, and blends thereof have sufficiently high heat resistance to such sintering at high temperature.

Advantages

A polyimide tube according to the present invention has high thermal conductivity, is excellent in terms of mechanical strength and compressive strength, and provides a high fixing property and an excellent offsetting property. Such a polyimide tube excellent in terms of various characteristics can be produced by a process for producing a polyimide tube according to the present invention. A fixing belt according to the present invention including such a polyimide tube excellent in terms of various characteristics serving as a base member is a fixing belt with which a decrease in waiting time after the turning-on of power, a decrease in power consumption, an increase in fixing speed, and a decrease in fixing temperature can be achieved. In addition, the fixing belt has excellent mechanical strength and is excellent in terms of fixing property and offsetting property. Thus, the fixing belt is suitably used for, for example, a fixing unit in an image-forming apparatus employing an electrophotographic technique.

Figure 1:
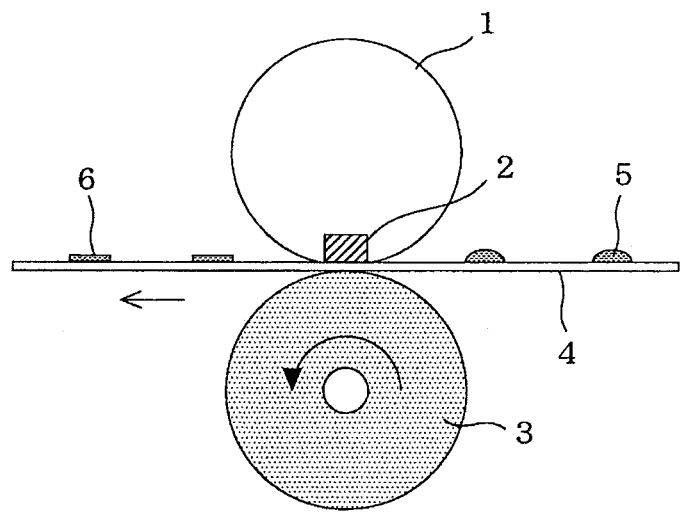
FIG. 1 is an explanatory view illustrating a fixing technique using a fixing belt.

REFERENCE NUMERALS 1 fixing belt
2 heater
3 pressing roller
4 transfer-receiving material
5 unfixed toner image
6 fixed toner image
11 polyimide tube
12 adhesive layer
13 fluorocarbon resin layer
21 supply part of a dispenser
22 discharge opening
23 coated polyimide varnish
24 core member

BEST MODES FOR CARRYING OUT THE INVENTION

Figure 2:
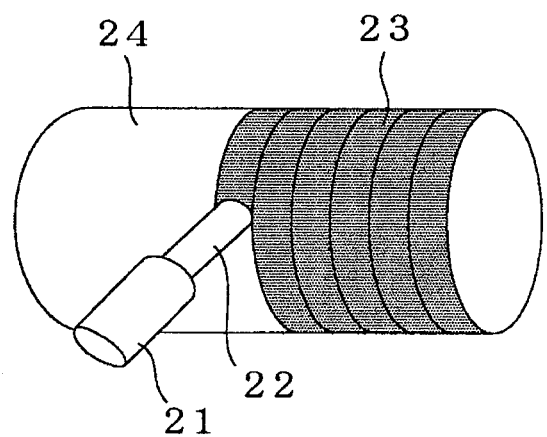
FIG. 2 is an explanatory view illustrating a coating process according to a dispenser method.

FIG. 2 is an explanatory view of a dispenser method used for a production process according to the present invention.

As illustrated in FIG. 2, while a cylindrical core member 24 is rotated in the circumferential direction, polyimide varnish is continuously supplied to the outer surface of the cylindrical core member 24 from a supply part 21 of a dispenser. A discharge opening 22 of the supply part is made in contact with the outer surface of the core member 24. Alternatively, instead of the cylindrical core member 24, a cylindrical tubular member may be used as the core member. In this case, as in FIG. 2, polyimide varnish can also be supplied to the outer surface of the core member; alternatively, while the discharge opening of the supply part of a dispenser is made in contact with the inside of the core member, polyimide varnish may also be supplied to the inner surface of the core member.

By continuously supplying polyimide varnish from the discharge opening 22 of the supply part 21 of a dispenser 1 and also relatively moving the supply part 21 with respect to the core member in the direction of the rotational axis of the core member, the supplied polyimide varnish is wound in a spiral fashion to form a coating layer 23. The supply part 21 of the dispenser is generally moved in the direction of the rotational axis of the core member 24. Alternatively, the core member 24 being rotated may be moved in the direction of the rotational axis of the core member 24 with respect to the supply part 21 of the dispenser. The rotation rate and the movement rate should be rates at which polyimide varnish is coated on the surface of the core member 24 without forming any interspaces and adjacent portions of polyimide varnish wound in a spiral fashion are joined together to form a uniform coating layer. The discharge opening 22 of the supply part of the dispenser is generally a nozzle.

After the above-described coating step, the coated polyimide varnish is cured (imidized) by heating in a standard manner to form a rigid and thin film having the shape of a tube. This tube is then released from the core member to provide a polyimide tube. Alternatively, after the coating step, a tube in which the coating layer is not fully imidized but has been solidified so as to have sufficient strength to maintain its tubular structure may be released from the member and the thus-released tube may be subsequently cured (imidized) by heating.

Polyimide varnish used for the production process contains, as a solid content, a polyimide precursor and an acicular highly thermally conductive filler such as carbon nanotubes. In addition, the content of the acicular highly thermally conductive filler is 15 volume percent or more relative to the total volume of the solid content. The polyimide varnish preferably has a viscosity at 25° C. of 100 to 15,000 poises, more preferably 100 to 3,000 poises. When the viscosity of the polyimide varnish is too high, portions of polyimide varnish coated so as to wind in a spiral fashion, the portions being in contact with one another to join together, have smaller thickness than the other portions of the coated polyimide varnish. This results in a coating layer having an irregular surface. When the viscosity of the polyimide varnish is too low, dripping or repelling of the varnish occurs upon the coating or drying of the varnish and the formation of a tube is not readily performed. By adjusting the viscosity of the polyimide varnish, dripping or repelling of the varnish does not occur and the coated solution is moved by gravity or centrifugal force after coating to have a flat solution surface. As a result, a flat coating layer without irregularities can be formed. To prevent dripping, repelling, and generation of irregularities with more certainty, the polyimide varnish used is preferably made to have a viscosity in the range of 100 to 3,000 poises.

The core member used has the shape of a cylinder or a cylindrical tube. Examples of a material of a core member used in the present invention are metals such as aluminum, aluminum alloys, iron, and stainless steel; ceramics such as alumina and silicon carbide; heat-resistant resins such as polyimide, polyamide imide, polybenzimidazole, and polybenzoxazole; and the like.

To enhance the releasability of the core member, a release agent composed of silicone oil or the like is preferably applied to the core member or the core member is preferably coated with a ceramic. Examples of such a ceramic include: silica, alumina, zirconia, and silicon nitride that are coated by a sol-gel process; alumina and zirconia coated by a thermal spraying process; and aluminum nitride coated by a sputtering process. Of these, preferred is ceramic coating by a sol-gel process, which does not require expensive apparatuses and allows easy coating operations.

There may be a case where portions having a slightly high chroma are generated along the spiral coating path to provide a banded pattern. In a severe case of this problem, such high-chroma portions and low-chroma portions have different thicknesses, resulting in generation of irregularities in the coating film. Such generation of a banded pattern can be suppressed as follows. By performing the coating in which the discharge opening of the supply part of a dispenser is in contact with a polyimide varnish layer coated spirally around a core member, under a condition where movement rate V (mm/second) and the number of rotations R (rotations/second) of the core member satisfy the range represented by a relational expression of (V/R)<3.0 (mm/number of rotations), for example, the stirring effect of a solution near the solution discharge opening is provided. Thus, the generation of a banded pattern and irregularities can be suppressed. The relational expression is preferably (V/R)<1.5 (mm/number of rotations).

For the discharge opening of the supply part of a dispenser, a plastic tube, a rubber tube, a metal tube, or the like may be used. Of these, in particular, preferred is a tube composed of polytetrafluoroethylene (PTFE) or a tetrafluoroethylene/perfluoroalkyl vinyl ether copolymer (PFA), the tube having appropriate rigidity and being less likely to scratch the surface of the core member.

A polyimide tube according to the present invention can be used as the base member of a fixing belt attached to a fixing unit in an image-forming apparatus employing an electrophotographic technique. A fixing belt according to the present invention preferably has a structure in which a polyimide tube according to the present invention is used as a belt base member and a fluorocarbon resin layer is disposed on the outer circumferential surface of the belt base member directly or with an adhesive layer therebetween.

A fluorocarbon resin for forming the fluorocarbon resin layer preferably has excellent heat resistance for the purpose of allowing continuous use of the fixing belt at high temperature. Specific examples of such a fluorocarbon resin include tetrafluoroethylene (PTFE), tetrafluoroethylene/perfluoroalkyl vinyl ether copolymers (PFA), and tetrafluoroethylene/hexafluoropropylene copolymers (FEP).

The fluorocarbon resin layer can be formed from only a fluorocarbon resin. However, to suppress offsetting caused by electrification, the fluorocarbon resin layer preferably contains an electrically conductive filler. Similarly, when the fluorocarbon resin layer and the polyimide tube are bonded with an adhesive therebetween, the adhesive layer serving as an intermediate layer may contain an electrically conductive filler. The fluorocarbon resin layer is disposed to impart releasability to the fixing belt and to suppress adhesion of toner on a transfer-receiving material such as a recording paper sheet to the surface of the fixing belt.

The electrically conductive filler is not particularly restricted; however, examples thereof include electrically conductive carbon black such as Ketjenblack; and powder of metal such as aluminum.

The fluorocarbon resin layer can be formed by a process of coating varnish containing a fluorocarbon resin and sintering the coated varnish. Alternatively, another process of covering with a fluorocarbon resin tube may also be employed. The fluorocarbon resin layer generally has a thickness of 1 to 30 μm, preferably about 5 to 15 μm.

To enhance the adhesion between the polyimide tube and the fluorocarbon resin layer of the fixing belt, an adhesive layer may be disposed as an intermediate layer. When desired, the adhesive layer may contain an electrically conductive filler. The adhesive layer is preferably formed of a heat-resistant resin in view of the heat resistance. A resin for forming the adhesive layer is not particularly restricted; however, a preferred example of such a resin is a mixture of a fluorocarbon resin and a polyamide-imide resin, a mixture of a fluorocarbon resin and a polyethersulfone resin, or the like. When the adhesive layer is made to contain an electrically conductive filler, the effect of shielding triboelectrification in the inner surface of the fixing belt and the effect of suppressing electrification in the outer surface of the fixing belt are enhanced. Thus, offsetting can be effectively suppressed. The electrically conductive filler for the adhesive layer can be the same as those for the outer layer. The mixing proportion of the electrically conductive filler is generally 0.5 to 10 percent by weight, preferably about 1 to 5 percent by weight. The adhesive layer generally has a thickness of 0.1 to 20 μm, preferably about 1 to 10 μm.

A fixing belt according to the present invention has a structure in which a fluorocarbon resin layer is disposed on the outer circumferential surface of a tube composed of polyimide cured (imidized) by heating, directly or with an adhesive layer between the fluorocarbon resin layer and the outer circumferential surface. When a fluorocarbon resin is sintered at high temperature upon the formation of the fluorocarbon resin layer, the following steps may be performed: in the step of producing a polyimide tube, a solidified tube is prepared by drying and removing a solvent, a fluorocarbon resin layer is formed on the tube directly or with an adhesive layer therebetween; and sintering of the fluorocarbon resin and curing of the polyimide tube by heating are subsequently simultaneously conducted.

Figure 3:
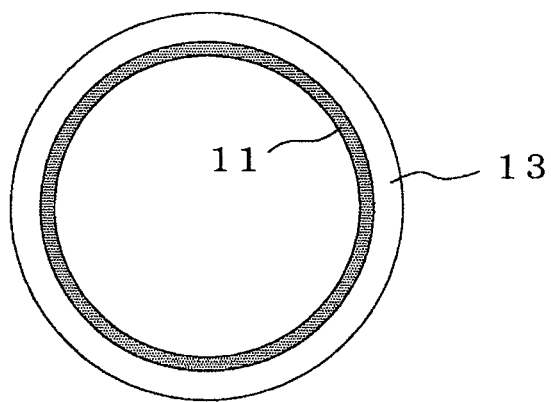
FIG. 3 is a sectional view illustrating the layer configuration of a fixing belt according to an embodiment.
Figure 4:
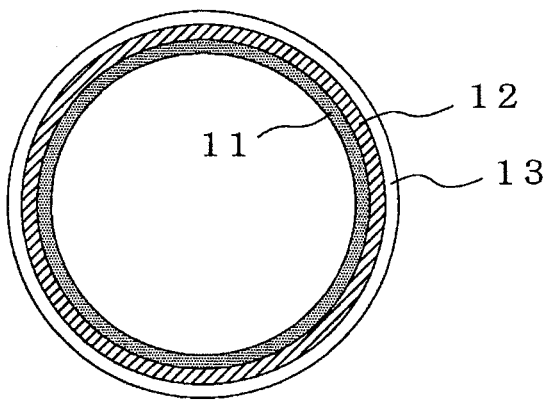
FIG. 4 is a sectional view illustrating the layer configuration of a fixing belt according to another embodiment.

FIG. 3 is a sectional view illustrating a fixing belt having a bilayer structure in which a fluorocarbon resin layer 13 is formed on the outer circumferential surface of a polyimide tube 11. FIG. 4 is a sectional view illustrating a fixing belt having a trilayer structure in which a fluorocarbon resin layer 13 is formed on the outer circumferential surface of a polyimide tube 11 with an adhesive layer 12 therebetween. Furthermore, a resin layer or a rubber layer other than the adhesive layer may be additionally disposed as an intermediate layer.

EXAMPLES

Hereinafter, the present invention will be more specifically described with reference to examples and comparative examples. However, the scope of the present invention is not restricted to the examples. Test methods and test conditions for evaluating performance in the examples and the comparative examples are as follows.

(1) Measurement of Thermal Diffusivity

A polyimide tube was measured in terms of thermal diffusivity (measurement temperature: 23° C.) with a periodicheating-method thermal-diffusivity measuring instrument (FTC-1) manufactured by ULVAC-RIKO, Inc. The resultant thermal diffusivity is multiplied by the specific heat and the density of the polyimide tube to calculate thermal conductivity.
(2) Measurement of Indentation Load (Compressive Load) (Compressive Strength)
Measurement instrument: Autograph manufactured by SHIMADZU CORPORATION
Indentation jig: disc-shaped (diameter: 1.3 cm)
Measurement method: the lower portion of a polyimide tube is fixed and the load at which the polyimide tube is compressed by 1 mm with the indentation jig is measured.
(3) Fixing Property Test
Test method: A polyimide tube is fixed on an aluminum plate.
Toner is sprinkled over the polyimide tube and the resultant sample is heated to 150° C.
A paper sheet is pressed onto the toner and rubbed against the toner about five times. The paper sheet is subsequently removed and inspected to determine whether the toner has been transferred to the paper sheet and evaluated in accordance with the following criteria.
Excellent: the toner has been completely transferred to the paper sheet
Good: most of the toner has been transferred to the paper sheet
Poor: a large amount of the toner remains on the polyimide tube
(4) Offsetting Test
A polyimide tube is installed in a fixing unit and the occurrence of offsetting is evaluated in accordance with the following criteria.
Good: no offsetting has occurred
Poor: offsetting has occurred
(5) Orientation
Test pieces were cut from a polyimide tube and measured for moduli of elasticity at two positions in the circumferential direction and the axial direction of the tube in accordance with JIS K 7161 by using an Autograph "AG-IS" manufactured by SHIMADZU CORPORATION at a tension speed of 1.7 mm/s and at a chuck-to-chuck distance of 30 mm.
The orientation was calculated with the following equation from the thus-measured modulus of elasticity in the circumferential direction and the thus-measured modulus of elasticity in the axial direction.
Orientation=the modulus of elasticity in the circumferential direction/the modulus of elasticity in the axial direction
(6) The following varnishes were used for polyimide precursor varnishes serving as materials.
"U-varnish S-301" manufactured by Ube Industries, Ltd., specific gravity: 1.446: a varnish (hereafter, denoted by an abbreviation of "U varnish S") obtained by dissolving, in a concentration of 18%, a polyimide precursor for forming a polyimide resin having the repeating unit represented by Formula (A) in a solvent (N-methylpyrrolidone)
"Pyre ML RC-5019" manufactured by I. S. T Corporation: a varnish (hereafter, denoted by an abbreviation of "Pyre ML") obtained by dissolving, in a concentration of 15%, a polyimide precursor for forming a polyimide resin having the repeating unit represented by Formula (C) in a solvent (N-methylpyrrolidone)
(7) Carbon nanotubes serving as a material were "VGCF" manufactured by SHOWA DENKO K. K. having a diameter of 150 nm, a length of 8 μm, and a specific gravity of 2.0.

Example 1

Carbon nanotubes and boron nitride ("MBN-010T" manufactured by Mitsui Chemicals, Inc.; graphite-structure BN; specific gravity: 2.27) were added to U varnish S (polyimide precursor varnish) respectively in 15 volume percent and 15 volume percent relative to the total volume of the solid content (the volume of the solid content in the varnish is defined as 100 volume percent). The resultant mixture was pre-stirred with a stirrer, mixed with a triple roll mill, and subsequently subjected to vacuum degassing. Thus, a polyimide varnish containing the above-described components was prepared.
A core member used was an aluminum cylinder having an outer diameter of 20 mm the outer surface of which was coated with ceramic. A nozzle (discharge opening) attached to the supply part of a dispenser was made in contact with the outer surface of the core member.
The polyimide varnish was coated over the core member by supplying the polyimide varnish at a constant rate to the outer surface of the core member from the nozzle of the supply part of the dispenser while the core member was rotated and the nozzle was moved at a certain rate in the direction of the rotational axis of the core member. The nozzle of the supply part of the dispenser was constituted by a PTFE tube having an inner diameter of 2 mm and an outer diameter of 4 mm. The nozzle was moved from a position (upon the initiation of the supply) that was 20 mm away from the right end of the core member to a position (upon the termination of the supply) that was 20 mm away from the left end of the core member. After the coating, the core member was heated stepwise to 400° C. while the core member was rotated. After the core member was cooled, a coating film composed of the solidified polyimide resin was released as a tube from the core member. The resultant polyimide tube had a thickness of 80 μm, an outer diameter of 24.2 mm, and a length of 233 mm.
The resultant polyimide tube was measured in the above-described manner in terms of thermal diffusivity, indentation load, and fixing property and was subjected to the offsetting test. The polyimide tube was also subjected to a tensile test in the axial direction and the circumferential direction in the above-described manner to determine the orientation of the polyimide tube. The results are shown in Table I.

Example 2

Carbon nanotubes were added to a polyimide precursor varnish that was a mixture of U varnish S and Pyre ML in 90:10 (proportion by weight), in 25 volume percent relative to the total volume of the solid content. The resultant mixture was pre-stirred with a stirrer, mixed with a triple roll mill, and subsequently subjected to vacuum degassing. Thus, a polyimide varnish containing the above-described components was prepared. A polyimide tube was prepared under the same conditions as in EXAMPLE 1 except that the thus-prepared polyimide varnish was used. This polyimide tube was subjected to the same measurements and tests as in EXAMPLE 1. The results are shown in Table I.

Example 3

A polyimide tube was prepared under the same conditions as in EXAMPLE 2 except that the amount of the carbon nanotubes was made 30 volume percent relative to the total volume of the solid content. This polyimide tube was subjected to the same measurements and tests as in EXAMPLE 1. The results are shown in Table I.

Example 4

A polyimide tube was prepared under the same conditions as in EXAMPLE 2 except that the amount of the carbon nanotubes was made 30 volume percent relative to the total volume of the solid content and the mixing proportion of U varnish S and Pyre ML was made 80:20 (proportion by weight). This polyimide tube was subjected to the same measurements and tests as in EXAMPLE 1. The results are shown in Table I.

Example 5

A polyimide tube was prepared under the same conditions as in EXAMPLE 2 except that the amount of the carbon nanotubes was made 30 volume percent relative to the total volume of the solid content and the mixing proportion of U varnish S and Pyre ML was made 70:30 (proportion by weight). This polyimide tube was subjected to the same measurements and tests as in EXAMPLE 1. The results are shown in Table I.

Example 6

A polyimide tube was prepared under the same conditions as in EXAMPLE 2 except that the amount of the carbon nanotubes was made 35 volume percent relative to the total volume of the solid content. This polyimide tube was subjected to the same measurements and tests as in EXAMPLE 1. The results are shown in Table II.

Example 7

A polyimide tube was prepared under the same conditions as in EXAMPLE 2 except that the amount of the carbon nanotubes was made 35 volume percent relative to the total volume of the solid content and the mixing proportion of U varnish S and Pyre ML was made 80:20 (proportion by weight). This polyimide tube was subjected to the same measurements and tests as in EXAMPLE 1. The results are shown in Table II.

Example 8

A polyimide tube was prepared under the same conditions as in EXAMPLE 2 except that the amount of the carbon nanotubes was made 40 volume percent relative to the total volume of the solid content. This polyimide tube was subjected to the same measurements and tests as in EXAMPLE 1. The results are shown in Table II.

Example 9

A polyimide tube was prepared under the same conditions as in EXAMPLE 2 except that the amount of the carbon nanotubes was made 40 volume percent relative to the total volume of the solid content and the mixing proportion of U varnish S and Pyre ML was made 80:20 (proportion by weight). This polyimide tube was subjected to the same measurements and tests as in EXAMPLE 1. The results are shown in Table II.

Example 10

A polyimide tube was prepared under the same conditions as in EXAMPLE 2 except that the amount of the carbon nanotubes was made 40 volume percent relative to the total volume of the solid content and the mixing proportion of U varnish S and Pyre ML was made 70:30 (proportion by weight). This polyimide tube was subjected to the same measurements and tests as in EXAMPLE 1. The results are shown in Table II.

Comparative Example 1

Instead of a polyimide tube, a SUS tube having a thickness of 30 μm, an outer diameter of 24 mm, and a length of 233 mm was prepared. This SUS tube was measured in terms of thermal diffusivity, indentation load, and fixing property and was subjected to the offsetting test in the above-described manner. The results are shown in Table III.

Comparative Example 2

Boron nitride ("MBN-010T" manufactured by Mitsui Chemicals, Inc.) was added to a polyimide precursor varnish that was a mixture of U varnish S and Pyre ML in 90:10 (proportion by weight), in 25 volume percent relative to the total volume of the solid content. The resultant mixture was pre-stirred with a stirrer, mixed with a triple roll mill, and subsequently subjected to vacuum degassing. Thus, a polyimide varnish containing the above-described components was prepared. A polyimide tube was prepared under the same conditions as in EXAMPLE 1 except that the thus-prepared polyimide varnish was used. This polyimide tube was subjected to the same measurements and tests as in EXAMPLE 1. The results are shown in Table III.

Comparative Example 3

A polyimide tube was prepared under the same conditions as in EXAMPLE 1 except that carbon nanotubes and boron nitride were not added. This polyimide tube was subjected to the same measurements and tests as in EXAMPLE 1. The results are shown in Table III.

Comparative Example 4

A polyimide tube was prepared under the same conditions as in EXAMPLE 1 except that the amount of the carbon nanotubes added was made 10 volume percent relative to the total volume of the solid content (the volume of the solid content in the varnish is defined as 100 volume percent). This polyimide tube was subjected to the same measurements and tests as in EXAMPLE 1. The results are shown in Table III.

Comparative Example 5

Carbon nanotubes were added to a polyimide precursor varnish that was a mixture of U varnish S and Pyre ML in 90:10 (proportion by weight), in 30 volume percent relative to the total volume of the solid content. The resultant mixture was pre-stirred with a stirrer, mixed with a triple roll mill, and subsequently subjected to vacuum degassing. Thus, a polyimide varnish containing the above-described components was prepared.

An aluminum cylinder (core member) in which the outer diameter was 20 mm and the outer surface was coated with ceramic was immersed in the thus-prepared polyimide varnish and subsequently withdrawn. Then, the core member was heated stepwise to 400° C. while the core member was rotated. After the core member was cooled, a coating film composed of the solidified polyimide resin was released as a tube from the core member. The resultant polyimide tube had a thickness of 80 μm. This polyimide tube was subjected to the same measurements and tests as in EXAMPLE 1. The results are shown in Table III.

TABLE I

|  | Example 1 | Example 2 | Example 3 | Example 4 | Example 5 |
|---|---|---|---|---|---|
| Base material | PI | PI | PI | PI | PI |
| Filler | CNF | CNF | CNF | CNF | CNF |
| Amount (vol %) | 15 | 25 | 30 | 30 | 30 |
| Second filler | BN | — | — | — | — |
| Amount (vol %) | 15 | — | — | — | — |
| U varnish S (wt %) | 100 | 90 | 90 | 80 | 70 |
| Pyre ML (wt %) | 0 | 10 | 10 | 20 | 30 |
| Thickness (μm) | 80 | 80 | 80 | 80 | 80 |
| Indentation load (N) | 0.7 | 0.5 | 0.6 | 0.5 | 0.5 |
| Thermal Diffusivity (×$10^{-7}$ m$^2$/s) | 7 | 9 | 11 | 11 | 11 |
| Fixing property | Good | Good | Excellent | Excellent | Excellent |
| Offsetting test | Good | Good | Good | Good | Good |
| Tensile test (axial direction) Elongation (%) | 18 | 26 | 26 | 26 | 27 |
| Tensile test (axial direction) Modulus of elasticity (kgf/mm$^2$) | 520 | 540 | 504 | 497 | 505 |
| Tensile test (circumferential direction) Elongation (%) | 9 | 14 | 12 | 16 | 25 |
| Tensile test (circumferential direction) Modulus of elasticity (kgf/mm$^2$) | 810 | 818 | 794 | 810 | 758 |
| Orientation | 1.56 | 1.52 | 1.57 | 1.63 | 1.50 |
| Tube preparation method |  |  | Dispenser |  |  |

TABLE II

|  | Example 6 | Example 7 | Example 8 | Example 9 | Example 10 |
|---|---|---|---|---|---|
| Base material | PI | PI | PI | PI | PI |
| Filler | CNF | CNF | CNF | CNF | CNF |
| Amount (vol %) | 35 | 35 | 40 | 40 | 40 |
| Second filler | — | — | — | — | — |
| Amount (vol %) | — | — | — | — | — |
| U varnish S (wt %) | 90 | 80 | 90 | 80 | 70 |
| Pyre ML | 10 | 20 | 10 | 20 | 30 |
| Thickness (μm) | 80 | 80 | 80 | 80 | 80 |
| Indentation load (N) | 0.7 | 0.6 | 0.7 | 0.7 | 0.6 |
| Thermal Diffusivity (×$10^{-7}$ m$^2$/s) | 14 | 14 | 20 | 20 | 20 |
| Fixing property | Excellent | Excellent | Excellent | Excellent | Excellent |
| Offsetting | Good | Good | Good | Good | Good |
| Tensile test (axial direction) Elongation (%) | 20 | 22 | 18 | 21 | 23 |
| Tensile test (axial direction) Modulus of elasticity (kgf/mm$^2$) | 510 | 520 | 520 | 522 | 521 |
| Tensile test (circumferential direction) Elongation (%) | 10 | 11 | 8 | 10 | 12 |
| Tensile test (circumferential direction) Modulus of elasticity (kgf/mm$^2$) | 800 | 796 | 810 | 812 | 808 |
| Orientation | 1.57 | 1.53 | 1.56 | 1.56 | 1.55 |
| Tube preparation method |  |  | Dispenser |  |  |

TABLE III

|  | Comparative example 1 | Comparative example 2 | Comparative example 3 | Comparative example 4 | Comparative example 5 |
|---|---|---|---|---|---|
| Base material | SUS | PI | PI | PI | PI |
| Filler | — | BN | — | CNF | CNF |
| Amount (vol %) | — | 25 | None | 10 | 30 |
| Second filler | — | — | — | BN | — |
| Amount (vol %) | — | — | — | 15 | — |
| U varnish S (wt %) | — | 90 | 100 | 100 | 90 |
| Pyer-ML | — | 10 | 0 | 0 | 10 |
| Thickness (μm) | 30 | 80 | 80 | 80 | 80 |
| Indentation load (N) | 0.5 | 0.4 | 0.2 | 0.5 | 0.4 |
| Thermal Diffusivity (×$10^{-7}$ m$^2$/s) | 34 | 2.7 | 1.3 | 5 | 12 |
| Fixing property | Excellent | Poor | Poor | Poor | Excellent |
| Offsetting | Good | Poor | Poor | Good | Poor |
| Tensile test (axial direction) Elongation (%) | — | 25 | 30 | 24 | 22 |
| Tensile test (axial direction) Modulus of elasticity (kgf/mm$^2$) | — | 682 | 737 | 550 | 700 |
| Tensile test (circumferential direction) Elongation (%) | — | 20 | 28 | 20 | 23 |

TABLE III-continued

| | Comparative example 1 | Comparative example 2 | Comparative example 3 | Comparative example 4 | Comparative example 5 |
|---|---|---|---|---|---|
| Tensile test (circumferential direction) Modulus of elasticity (kgf/mm$^2$) | — | 780 | 828 | 700 | 650 |
| Orientation | | 1.14 | — | 1.27 | 0.93 |
| Tube preparation method | — | | Dispenser | | Dippig |

The polyimide tubes of EXAMPLES 1 to 10, which were composed of a polyimide resin composition in which carbon nanotubes were dispersed in 15 volume percent or more relative to the total volume of the composition in a polyimide resin, were prepared by the dispenser method, and had an orientation of 1.5 or more, were excellent in terms of thermal diffusivity (thermal conductivity) and hence were also excellent in terms of fixing property. These polyimide tubes also had high indentation load (compressive strength) and hence were also excellent in terms of offsetting property. In EXAMPLES 1 to 10, the fixing property and the offsetting property that were substantially equivalent to those of COMPARATIVE EXAMPLE 1 in which the SUS tube was used were achieved.

The polyimide tubes of COMPARATIVE EXAMPLES 2 and 3, which did not contain carbon nanotubes, had low thermal diffusivity (thermal conductivity) and low indentation load (compressive strength) and hence had a poor fixing property and a poor offsetting property. The polyimide tube of COMPARATIVE EXAMPLE 4, which contained carbon nanotubes dispersed in 10 volume percent, had insufficient thermal diffusivity (thermal conductivity) and hence had a poor fixing property.

In COMPARATIVE EXAMPLE 5, although the amount of carbon nanotubes dispersed was 30 volume percent, the polyimide tube was prepared by the dipping method and hence the polyimide tube had low orientation. As a result, the polyimide tube had low indentation load (compressive strength) and a poor offsetting property.

INDUSTRIAL APPLICABILITY

A polyimide tube according to the present invention can be used as a base member of a fixing belt installed in a fixing unit in an image-forming apparatus employing an electrophotographic technique.

The invention claimed is:

1. A fixing belt comprising a polyimide tube serving as a belt base member and a fluorocarbon resin layer disposed on an outer circumferential surface of the belt base member directly or with an adhesive layer therebetween,
wherein the polyimide tube comprising a polyimide resin composition, wherein the polyimide resin composition contains a polyimide resin in which an acicular thermally conductive filler is dispersed; and the acicular thermally conductive filler has an orientation in the circumferential direction of 1.3 or more, the orientation being represented by (a modulus of elasticity in a circumferential direction/a modulus of elasticity in an axial direction) of the polyimide resin composition,
wherein the acicular thermally conductive filler includes at least nanotubes of 15 volume percent or more relative to a total solid content of the polyimide varnish, and
wherein the nanotubes have a short-axis diameter of 300 nm or less and have a length of 30 μm or less, and the acicular thermally conductive filler is dispersed in the polyimide resin in 15 volume percent or more and 50 volume percent or less relative to the total volume of the composition.

2. A fixing belt according to claim 1, wherein the polyimide tube has a thickness of 10 to 150 μm.

3. A fixing belt according to claim 1, wherein the polyimide resin is at least one polyimide resin selected from the group consisting of
a polyimide resin A including a repeating unit represented by Formula (A) below;

[Formula 1]

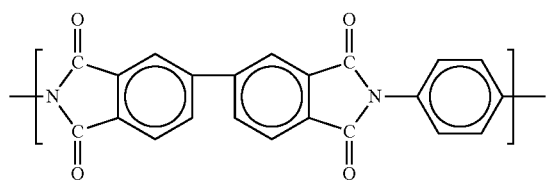

(A)

a polyimide resin B including a repeating unit represented by Formula (B) below; and

[Formula 2]

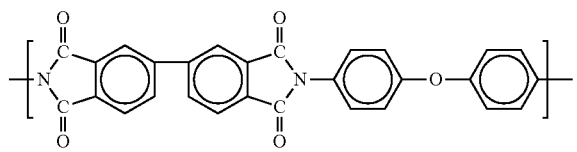

(B)

a polyimide resin C including a repeating unit represented by Formula (C) below.

[Formula 3]

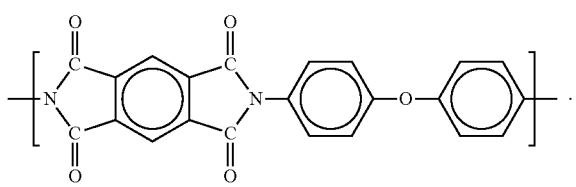

(C)

4. A fixing belt according to claim 1, wherein the polyimide resin is at least one polyimide copolymer selected from the group consisting of (1) a polyimide copolymer 1 including a repeating unit represented by Formula (A) below and

[Formula 4]

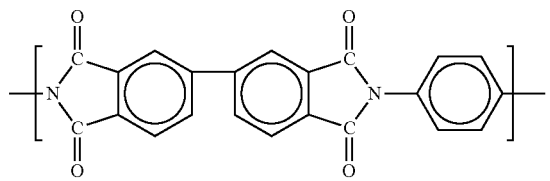
(A)

a repeating unit represented by Formula (B) below;

[Formula 5]

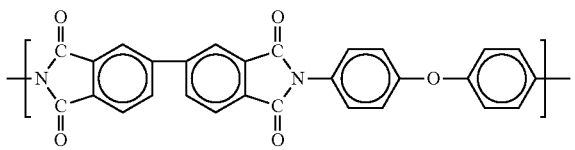
(B)

(2) a polyimide copolymer 2 including a repeating unit represented by Formula (D) below and

[Formula 6]

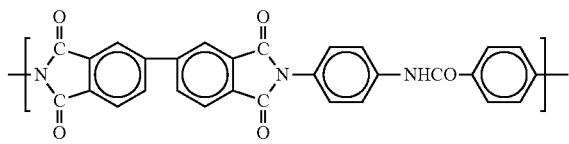
(D)

a repeating unit represented by Formula (B) below;

[Formula 7]

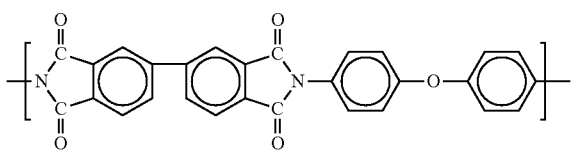
(B)

(3) a polyimide copolymer 3 including a repeating unit represented by Formula (E) below and

[Formula 8]

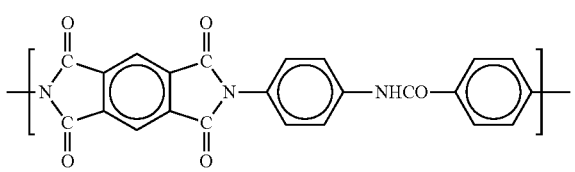
(E)

a repeating unit represented by Formula (C) below;

[Formula 9]

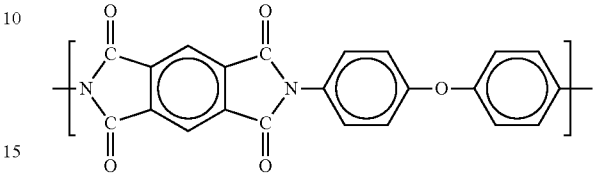
(C)

(4) a polyimide copolymer 4 including a repeating unit represented by Formula (A) below and

[Formula 10]

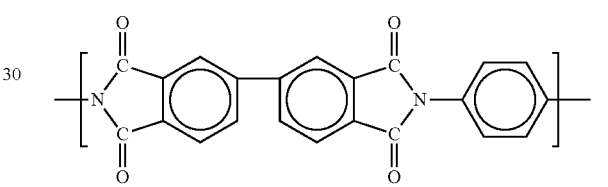
(A)

a repeating unit represented by Formula (F) below; and

[Formula 11]

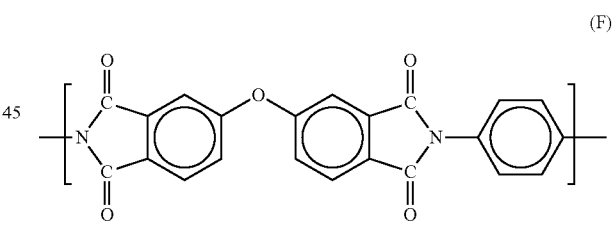
(F)

(5) a polyimide copolymer 5 including a repeating unit represented by Formula (A) below and

[Formula 12]

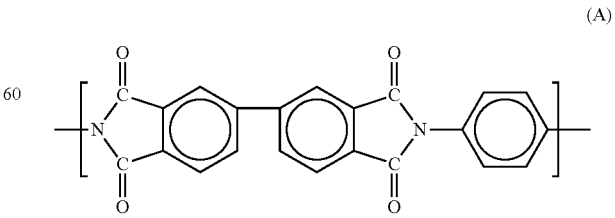
(A)

a repeating unit represented by Formula (G) below.

[Formula 13]

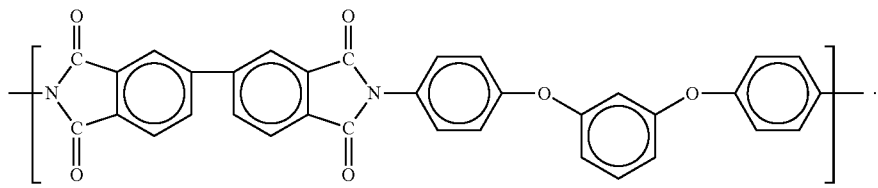

(G)

5. A process for producing a fixing belt comprising:
preparing a polyimide tube serving as a belt base member and a fluorocarbon resin layer being disposed on an outer circumferential surface of the belt base member directly or with an adhesive layer therebetween,
wherein a process for producing the polyimide tube comprising:
a step of bringing a discharge opening of a supply part of a dispenser close to or in contact with an outer surface of a cylindrical core member or an outer surface or an inner surface of a cylindrical tubular core member,
and forming a coating layer by continuously supplying polyimide varnish from the discharge opening to the outer surface of the cylindrical core member or the outer surface or the inner surface of the cylindrical tubular core member
while the core member is rotated and the discharge opening is relatively moved with respect to the core member in a direction of a rotational axis of the core member;
a step of, after the forming of the coating layer, solidifying or curing the coating layer; and
a step of, after the solidifying or curing, releasing the coating layer from the core member,
wherein the polyimide varnish is prepared by dispersing an acicular thermally conductive filler in a polyimide precursor solution,
wherein the acicular thermally conductive filler includes at least nanotubes of 15 volume percent or more relative to a total solid content of the polyimide varnish, and
wherein the nanotubes have a short-axis diameter of 300 nm or less and have a length of 30 μm or less, and
the acicular thermally conductive filler is dispersed in the polyimide resin in 15 volume percent or more and 50 volume percent or less relative to the total volume of the composition.

\* \* \* \* \*